H. BERAUD & E. J. ACHÉE.
DETACHABLE HOSE COUPLING.
APPLICATION FILED OCT. 7, 1908.
913,351.
Patented Feb. 23, 1909.
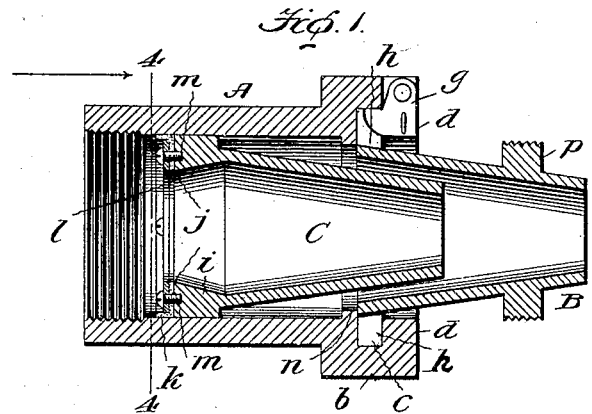
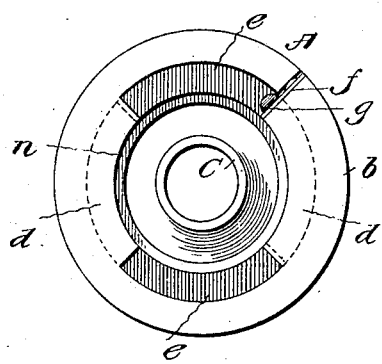
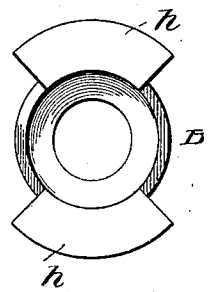
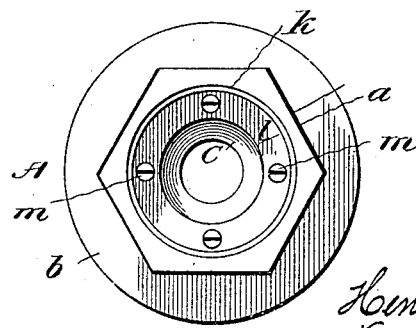
Witnesses
N. C. Healy
Inventors
Henry Beraud &
Emygde J. Achée
By James J. Shuhy
Attorney

UNITED STATES PATENT OFFICE.

HENRY BERAUD AND EMYGDE J. ACHÉE, OF PLAQUEMINE, LOUISIANA.

DETACHABLE HOSE-COUPLING.

No. 913,351.  Specification of Letters Patent.  Patented Feb. 23, 1909.

Application filed October 7, 1908. Serial No. 456,573.

*To all whom it may concern:*

Be it known that we, HENRY BERAUD and EMYGDE J. ACHÉE, citizens of the United States, residing at Plaquemine, in the parish of Iberville and State of Louisiana, have invented new and useful Improvements in Detachable Hose-Couplings, of which the following is a specification.

Our invention pertains to detachable hose couplings; and it contemplates the provision of a simple and durable coupling embodying such a construction that while its members may be expeditiously and easily connected and disconnected there is no liability of the said members becoming casually disconnected incidental to the use of the coupling or the throwing of a hose about.

The invention also contemplates the provision of a coupling having simple and efficient means for utilizing a head of water to render the joint between the members water-tight.

With the foregoing in mind the invention will be fully understood from the following description and claims when the same are read in connection with the drawings, accompanying and forming part of this specification, in which:

Figure 1 is a longitudinal central section of the detachable coupling constituting the best practical embodiment of our invention of which we are cognizant. Fig. 2 is an elevation of the forward or inner end of the female member of the coupling. Fig. 3 is a similar view of the inner end of the male member of the coupling. Fig. 4 is a transverse section taken in the plane indicated by the line 4—4 of Fig. 1, looking in the direction indicated by the arrow, but showing the female member in elevation.

Similar letters designate corresponding parts in all of the views of the drawings, referring to which:

A is the female member of our novel coupling, and B is the male member thereof.

In the present and preferred embodiment of our invention the female member A is interiorly threaded at its outer end for connection to a threaded pipe section on a hose or to any other type of conduit, though we would have it understood that without involving departure from the scope of our invention the member A may be connected to a conduit in any approved manner or else may be formed integral with a conduit. At *a* the member A is exteriorly of angular form in cross-section, and at its forward or inner end the said member A is provided with an enlargement *b* in which is formed a circular groove *c* disposed in rear or immediately at the inner side of two opposite flanges *d* separated by intervening spaces *e*. In addition to the salient features mentioned—*i. e.*, the groove *c* and the flanges *d* separated by intervening spaces *e*, the member A is provided with a shoulder *f* extending in the direction of its length and in alinement with one end of one flange *d*, which shoulder *f* is for the pivotal connection of a thumb-latch *g*. The said thumb-latch *g* lies parallel to and close against the shoulder *f* and is designed to be swung away from and toward the longitudinal center of the member A for an important purpose hereinafter set forth. At this point it will be noticed that the latch *g* normally rests in the position shown in Fig. 1 and entirely within the outline of the member A, and from this it follows that liability of the latch being bent or otherwise impaired when the member is thrown about is reduced to a minimum.

The male member B of the coupling is provided at its inner or forward end with diametrically opposite, radially disposed lugs *h* of a size to pass in the direction of the length of the coupling through the spaces *e* and also of a size to move, when the member is turned about its axis, in the groove *c* and assume positions back of the flanges *d* of the member A. When the member B is connected with the member A in the manner stated, it will be seen that each of the members is held against longitudinal movement with respect to the other and that there is little liability of the member B accidentally turning and becoming disconnected from the member A. It will also be seen that when the thumb-latch *g* is permitted to assume its normal position after the lugs *h* have been engaged with the flanges *d*, the said thumb-latch by resting in front of the adjacent end of one of the lugs *h* will prevent turning of the member B about its axis and consequently will preclude casual disconnection of the members. This is due in part to the fact that when one of the lugs *h* is positioned at the inner side of the thumb-latch *g*, the forward ends of the said lugs *h* bring up against abutments in the member A, as shown by dotted lines in Fig. 2, with the result that advancing movement of the lugs h beyond the positions shown in Fig. 2 is prevented.

As clearly shown in Fig. 1 the interior of the member B is tapered or gradually reduced in diameter from the inner end of the member and in the direction of the length thereof. This interior taper of the member B is designed to coöperate with an exteriorly tapered, tubular and slidable member C, the rear or outer end of which is enlarged, as indicated by i to afford a considerable abutment j for the action of a head of water. It will also be noticed by reference to Figs. 1 and 4 that the slidable member C is provided with a washer k which is preferably of the cup type and made of leather or other material suitable to the purpose, and is held on the rear end of the slidable member by a retaining ring l, connected to the slidable member through the medium of screws m.

It will be readily understood from the foregoing that when a head of water is permitted to pass in the direction of the arrow in Fig. 1 through our novel coupling, the said head will act upon and move the slidable member C and by so doing will wedge the said member C in the interiorly tapered member B, and in that way will render the joint between the members A and B watertight notwithstanding the pressure in the coupling. It will be noticed, however, in this connection that the slidable member C is carried entirely in the female member A of the coupling, and consequently is not liable to interfere with the connection and disconnection of the members A and B; and it will also be noticed that when the member B is removed from the member A an interior flange n in said member A will by opposing the enlargement i on the slide member C prevent displacement of the said slide member from the member A.

In Fig. 1 the male member B is provided with an exterior, threaded flange p for connection with an ordinary hose coupling member, but it is obvious that the member B may be connected with or formed integral with a conduit or source of supply of any description without involving departure from our claimed invention.

In addition to the practical advantages hereinbefore ascribed to our novel coupling, it will be noticed that the coupling is simple and inexpensive in construction and that it includes no delicate parts such as are liable to get out of order after a short period of use.

Having described our invention, what we claim and desire to secure by Letters-Patent, is:

1. In a detachable hose coupling, the combination of members detachably connected together and one of which has its interior tapered in direction away from the point of connection, and a slidable, sleeve-like member having a suitably packed abutment movable rectilinearly in the other of the first mentioned members and also having an exteriorly tapered portion adapted to be wedged in the interior taper of the first mentioned member.

2. In a detachable hose coupling, the combination of a female member, a male member having an interior taper extending from its inner end and in the direction of its length, coöperating means on the said members whereby the same may be detachably connected together, and a slidable sleeve-like member movable rectilinearly in the female member and having an enlargement at its rear end forming an abutment and also having an exteriorly tapered forward portion, a cup washer arranged against the abutment formed by the enlargement of the slidable member and also arranged against the inner side of the female member, and a retaining ring arranged against the washer and connected to the slidable member.

3. A detachable hose coupling comprising a male member having an interior taper extending from its inner end and in the direction of its length and also having opposite, radially disposed lugs on the outer side of its inner end, a female member having at its inner end an enlargement in which is an interior circular groove and also having flanges separated by intervening spaces and disposed immediately in front of the said groove and further having an interior flange n disposed in rear of the said groove, and a slidable sleeve-like member movable rectilinearly in the female member and having an enlargement at its rear end forming an abutment and also having an exteriorly tapered forward portion, a cup washer arranged against the abutment formed by the enlargement of the slidable member and also arranged against the inner side of the female member, and a retaining ring arranged against the washer and connected to the slidable member.

In testimony whereof we have hereunto set our hands in presence of two subscribing witnesses.

HENRY BERAUD.
EMYGDE J. ACHÉE.

Witnesses:
T. D. SPILLER,
G. L. HUFF.